United States Patent [19]
Der Marderosian et al.

[11] 3,869,662
[45] Mar. 4, 1975

[54] APPARATUS FOR CONTROLLABLY STRESSING INTERNAL CONDUCTORS OF A CLOSED DEVICE

[75] Inventors: Aaron C. Der Marderosian, Marlboro; Paul E. Nelson, Maynard; Donald F. Stinnett, Framingham, all of Mass.

[73] Assignee: Raytheon Company, Lexington, Mass.

[22] Filed: Sept. 10, 1973

[21] Appl. No.: 395,685

Related U.S. Application Data

[63] Continuation of Ser. No. 233,532, March 10, 1972, abandoned.

[52] U.S. Cl.............................................. 324/34 R
[51] Int. Cl............................................... G01r 33/00
[58] Field of Search........... 324/34 R, 28 R; 73/150; 335/298

[56] References Cited
UNITED STATES PATENTS

| | | | |
|---|---|---|---|
| 750,594 | 1/1904 | Campbell | 335/298 |
| 2,677,275 | 5/1954 | Dabrowski | 73/150 |
| 2,894,388 | 7/1959 | Cook et al. | 73/150 |
| 3,609,524 | 9/1971 | Kazmer | 324/28 R |

OTHER PUBLICATIONS

Krongelb, S., Measuring The Adhesion of Thin Metal Films to Substrates, IBM Tech. Bull., Vol. 12, No. 4, Sept. 1969, p. 519.
Phillips, et al., Electromagnetic Measuring Adhesions of Metal Lines, IBM Tech. Bull., Vol. 13, No. 11, Ap. 1971, p. 3227.

*Primary Examiner*—Robert J. Corcoran
*Attorney, Agent, or Firm*—John T. Meaney; Harold A. Murphy; Joseph D. Pannone

[57] ABSTRACT

Method and apparatus for controllably stressing the bonded members of a closed semiconductor device, said method and apparatus comprising adjustable means for establishing a magnetic field of predetermined intensity, movable support means for positioning a bonded member of the semiconductor device in the field such that a magnetic force of predetermined value acts on the bonded member, and electrical means for determining if the associated bond is adversely affected by the action of the magnetic force.

5 Claims, 3 Drawing Figures

PATENTED MAR 4 1975  3,869,662

APPARATUS FOR CONTROLLABLY STRESSING INTERNAL CONDUCTORS OF A CLOSED DEVICE

This is a continuation of application Ser No. 233,532 filed Mar. 10, 1972, and now abandoned.

BACKGROUND OF THE INVENTION

This invention relates generally to magnetic means for testing the reliability of bonded members and is concerned more particularly with a method and apparatus for controllably stressing the internal leads of a closed semiconductor device.

In the manufacture of semiconductor devices, selected surface areas of semiconductor wafers usually are metallized and then electrically connected to spaced terminal posts by suitable means such as bonded wire leads, for example. To ensure reliability these leads generally are controllably stressed to a minimum acceptable value, as by mechanically pulling them, for example, prior to closing the semiconductor devices. Subsequently, these semiconductor units may be subjected to severe environmental conditions, such as shock, vibration, thermal cycling or centrifuge treatment, for examples, and then electrically tested to determine if certain electrical characteristics of the devices have deteriorated beyond specified limits.

However, this electrical test does not provide adequate means for screening out latent or time dependent failures. For example, a defective bond may have been weakened by the severe environmental treatment but the connecting lead may not have parted from the associated region of the device. Consequently, the device may pass the electrical test without giving any indication of having a poorly bonded lead. As a result, this device later may be installed in an expensive piece of equipment, such as a missile, for example, and eventually cause catastrophic failure when the poorly bonded lead separates from the associated region of the device.

Failures of the described type may be prevented by controllably stressing the bonded leads of a semiconductor device after it has been exposed to severe environmental treatment. However, up to the present time, the means most commonly used for stressing these bonded leads to a minimum acceptable value is the pull test. On the other hand, a mechanical pull test cannot be applied in this instance, since the semiconductor device is closed prior to environmental testing. Therefore, it would be advantageous to have a means for controllably stressing the internal leads of a semiconductor device after the casing of the device has been closed.

SUMMARY OF THE INVENTION

Accordingly, this invention provides a method comprising the steps of positioning a bonded lead of a semiconductor device in predetermined spaced relationship with a magnetic device, subjecting the lead to a magnetic force of predetermined value, passing an electrical current through the lead, and monitoring the flow of electrical current to determine if the lead has been adversely affected by the magnetic force. For practicing the foregoing method, this invention also provides apparatus comprising adjustable means for establishing a magnetic field of predetermined intensity, movable support means for positioning the semiconductor device in the magnetic field, a source of electrical power for passing a current through a bonded lead of the semiconductor device and electrical indicating means for monitoring the flow of electrical current.

One embodiment of this invention provides an adjustable means comprising a permanent magnet which is slidably supported relative to a bonded lead of a semiconductor device, a movable support means comprising a rotatable table having a recess therein for holding the semiconductor device in the desired spaced relationship with the magnet, a source of electrical power comprising a battery which is interruptingly connected through a load resistor to two terminal members of the semiconductor device, and an indicating means comprising an oscilloscope which is electrically connected across the load resistor. In an alternative embodiment, the adjustable means includes an electromagnet having a coil which is interruptingly connected across a chargeable bank of storage capacitors. In another alternative embodiment, the adjustable means includes an electromagnet having a coil which is interruptedly connected across an alternating voltage source.

BRIEF DESCRIPTION OF THE DRAWING

For a better understanding of this invention, reference is made to the accompanying drawings, wherein.

DESCRIPTION OF THE PREFERRED EMBODIMENTS

Figure 1:
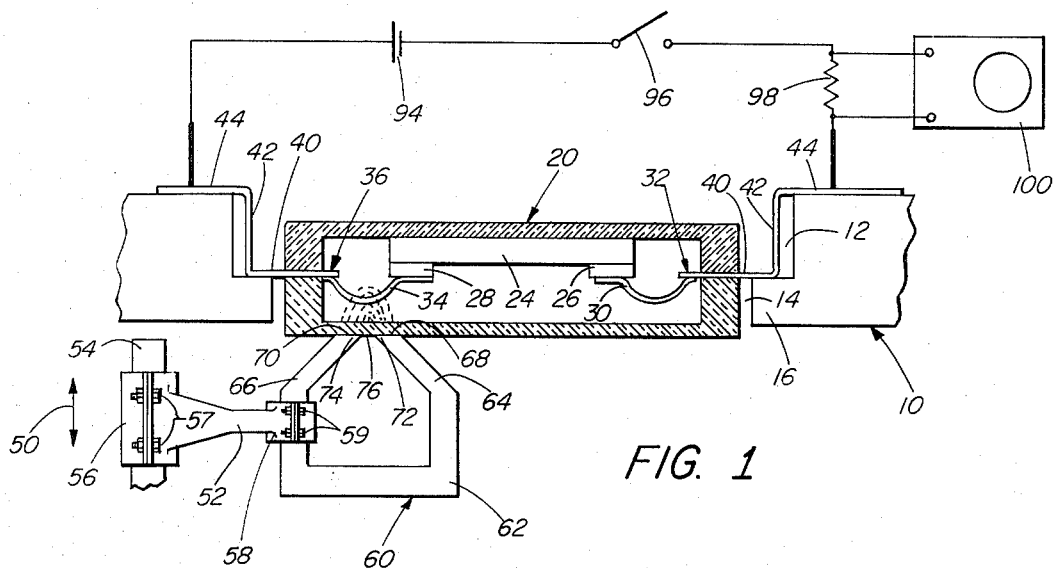
FIG. 1 is a fragmentary elevational view, partly in section, of one embodiment of this invention.

Referring more particularly to the drawing wherein like characters of reference designate like parts throughout the several views, there is shown in FIG. 1 a support table 10 which, preferably, is made of a nonmagnetic material, such as wood, for example. Table 10 is provided with an aligned pair of communicating openings 12 and 14, respectively, the opening 12 being disposed in the upper surface of the table and the opening 14 being disposed in the lower surface. Opening 12 is made larger than opening 14 to provide, at the bottom of opening 12, a radially extending shoulder 16 which forms the periphery of opening 14.

Disposed in the aligned openings 12 and 14 of table 10 is a semiconductor device 20 which may be of the integrated circuit type, for example. The device 20 is provided with an external casing 22 of nonmagnetic material, such as ceramic, for example, which encloses semiconductor wafer 24. Affixed to selected surface areas of the wafer 24 are isolated metallic pads, such as 26 and 28, for example, which are disposed in electrical communication with respective underlying regions of the semiconductor material. The pad 26 is attached, as by ultrasonic bonding, for example, to one end of a fine wire lead 30 which, preferably, is made of magnetic material, such as nickel, for example. The other end of lead 30 is affixed, as by welding, for example, to an internal end portion of an externally extending terminal leg 32. The intermediate portion of lead 30, preferably, is of sufficient length to provide a service loop between the attached ends of the lead. Similarly, another fine wire lead 34 is connected between the pad 28 and a terminal leg 36.

Although only two metallic pads, 26 and 28 respectively, are shown, it is to be understood that the wafer assembly 24 may be provided with an array of such pads, each of which may be connected electrically to a respective terminal leg as described. Thus, a plurality of terminal legs may protrude from the casing 22 thereby giving the semiconductor device 20 a bug-like appearance. Each of the terminal legs, such as 32 or 36, for examples, may have an inner end portion 40 extending radially out of the casing 22, an intermediate portion 42 extending substantially perpendicular thereto, and an outer end portion 44 extending substantially parallel to the inner end portion 40. Consequently, a bug-like device of the described type may be placed in the opening 12 such that the inner end portions 40 of the respective terminal legs rest on the upper surface of the shoulder 16 and the intermediate portions of the respective legs extend toward the upper surface of table 10. As a result, a portion of the casing 22 will be supported in the opening 14 and the outer end portions 44 of the respective terminal legs will extend over the rim of the opening 12. Preferably, the thickness of shoulder 16 is such that the casing 22 will protrude slightly out of the opening 14, and the depth of opening 12 is such that the outer end portions of the respective terminal legs will rest lightly on the upper surface of table 10. Also, the aligned opening 12 and 14, preferably, have respective configurations which conform to a plan view of the semiconductor device 20, which may be circular, oval, rectangular or any other configuration desired.

Positioned below the table 10 is a substantially parallel arm 52 which is slidably mounted on a rigid support member 54 by any convenient means, such as a clamping sleeve 56 carried on the adjacent end of arm 52 and cooperating bolts 57, for example. Arm 52 is made of nonmagnetic material, such as aluminum, for example, and is provided with suitable means, such as clamping sleeve 58 carried on the other end of arm 52 and cooperating bolts 59, for example, for adjustably fastening a magnetic device, such as permanent magnet 60, for example, to the arm 52. The magnet 60 has a generally U-shaped closed end 62 and converging pole pieces 64 and 66, respectively, which terminate in respective coplanar surfaces 68 and 70, thereby providing sharp edges 72 and 74, respectively, on opposing sides of a very narrow air gap 76. Thus, there exists between the planar surfaces 68 and 70 of respective pole pieces 64 and 66 a generally hemispherical magnetic field having a maximum intensity in the air gap 76 between the sharp edges 72 and 74, respectively.

Since the intensity of the field produced by magnet 60 decreases in accordance with the square of the distance from the air gap 76, an optimum distance for exerting the desired pulling force on the internal leads of a semiconductor device, such as 20, for example, may be calculated mathematically or determined empirically. Then, by utilizing the means for slidably mounting arm 52, such as clamping sleeve 56 and cooperating bolts 57, for example, the magnet 60 may be moved into the proper positional relationship with the semiconductor device 20. When it becomes necessary to maximize the effect of the magnetic field on the internal leads of device 20, the adjustable means for fastening magnet 60 to arm 52 may be utilized to bring the surfaces 68 and 70, respectively, of magnet 60 into abutting relationship with the casing 22 of device 20. Thus, it may be seen that the surfaces 68 and 70 need not be planar but may be arcuate, for example, or have any other configuration which may be utilized to dispose the magnetic device in the desired spaced relationship with the semiconductor device 20. However, the resulting configurations of surfaces 68 and 70, respectively, should provide sharply contoured ridges, such as the respective edges 72 and 74, for examples, on opposing sides of a very narrow air gap, such as 76, for example. In this manner, the magnet 60 will establish within the casing 22 a magnetic field which will tend to pull an internal lead, such as 34, for example, toward the air gap 76, similar to the action of an electrical motor, for example.

The table 10 may be rotatable with respect to the magnet 60, thereby providing means for passing the internal leads of device 20 sequentially through the magnetic field of magnet 60. Also, as indicated by the directional line 50, the support member 54 may be reciprocally movable, such as the corepiece of an electrical solenoid (not shown), for example, whereby the magnet 60 may be moved toward and away from the semiconductor device 20 in a repetitive manner. Thus, there will be exerted on an internal lead, such as 34, for example, a tugging action which may be more suitable for testing the bonded portions of the lead than a steady-state pulling action, for example.

Figure 2:
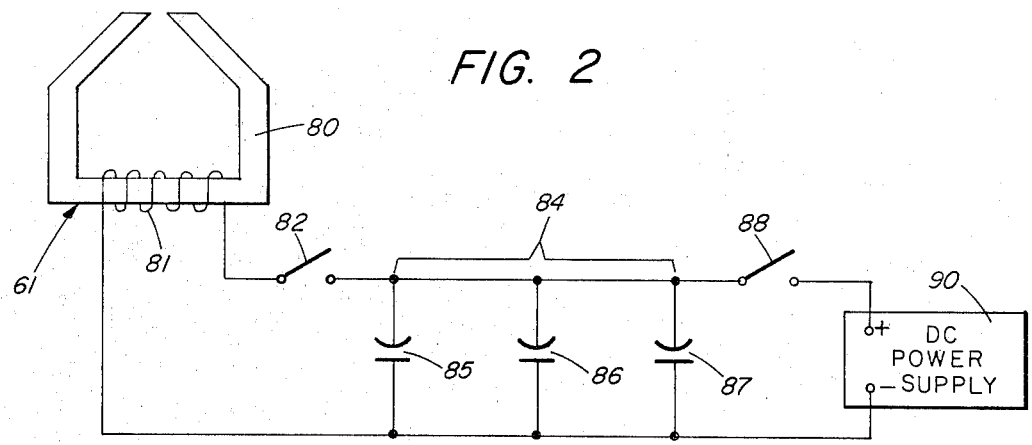
FIG. 2 is a schematic view of an alternative embodiment of this invention.

Alternatively, as shown in FIG. 2, the magnetic device may be an electromagnet 61 having a core 80 which is similar in shape to the permanent magnet 60 and is made of easily magnetized material, such as soft iron, for example. Helically wound around the closed end of core 80 is an electrical coil 81 having respective ends connected, through a control switch 82, to opposing sides of a capacitor bank 84 which may comprise one or a plurality of storage capacitors, such as 85, 86 and 87, for examples. The opposing sides of capacitor bank 84 are connected, through an energizing switch 88, to respective terminals of a polarized voltage source, such as a DC power supply 90, for example. Thus, when the energizing switch 88 is momentarily closed, as by a relay (not shown), for example, the capacitor bank 84 will be charged up to a preselected value of voltage, such as the voltage value of power supply 90, for example. Subsequently, when the control switch 82 is momentarily closed, as by a relay (not shown), for example, a direct current pulse of predetermined value will pass through the coil 81, thereby magnetizing the core 80 temporarily. As a result, the magnetic field, thus produced, by the electromagnet 61 will exert a tugging force of the desired value on the internal lead 34.

Figure 3:
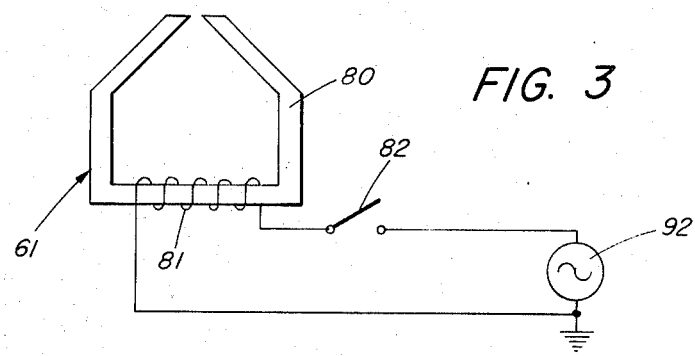
FIG. 3 is a schematic view of another alternative embodiment of this invention.

Alternatively, as shown in FIG. 3, the respective ends of coil 81 may be connected, through the control switch 82, to respective terminals of an alternating voltage source 92. Thus, when the switch 82 is closed momentarily, as described, a sequential series of alternating current pulses having a preselected value and frequency will pass through the coil 81. Consequently, the core 80 will be magnetized, first in one magnetic direction and then in the other, up to a predetermined intensity value and at a predetermined frequency rate. As a result, the electromagnet 61 will produce an alternating magnetic field which will exert on the internal lead 34 a repetitive tugging force of the desired value and frequency.

To determine if a bonded region of the internal lead 34 is adversely affected by the tugging action of the magnetic field, an electrical current may be passed through the lead and monitored for any indication of weakness. Thus, the metallic pad 26 may be in electrical communication with the metallic pad 28, as by way of a rectifying junction in the semiconductor material of wafer 24, for example. Consequently, a source of unidirectional current, such as battery 94, for example, may be connected through a control switch 96 and a load resistor 98 to terminal legs 32 and 36, respectively, in a manner suitable for passing a current through the lead 34. The resulting current flow may be monitored by use of conventional indicating means, as by connecting an oscilloscope 100 across the load resistor 98. In this manner, an adversely affected bonded region of the internal lead 34 may be indicated, as by electrical noise distortion, for example, on the screen of the oscilloscope 100.

If the internal lead 34 is made of nonmagnetic material, such as aluminum, for example, it may be controllably stressed by passing a current of preselected value in the desired direction through the lead. Thus, there will be established, around the lead 34, a coaxial magnetic field having a magnetic direction and intensity which is determined by the flow of current in the lead. As shown in FIG. 1, a coaxial magnetic field established around lead 34 will have lines of force which are more or less perpendicular to the generally hemispherical magnetic field of magnet 60. However, if the lead 34 is maintained in the same spatial relationship with the magnet 60 and is rotated 90°, the magnetic field of magnet 60 will counteract the coaxial lines of force on the far longitudinal side of the lead 34 and will enhance them on the near longitudinal side. Consequently, the lead 34 will be pulled toward the area of maximum intensity, in this instance air gap 76 of magnet 60, for example, by a magnetic force of predetermined value, in a manner similar to that achieved with internal leads made of magnetic material. Also the current flowing through the lead 34 may be varied in magnitude to produce a repetitive tugging force on the lead.

Thus, there has been disclosed herein a novel method and apparatus for controllably stressing the internal leads of a closed semiconductor device. The method comprises the steps of positioning a semiconductor device in predetermined spaced relationship with a magnetic device, subjecting an internal lead of the device to a magnetic field established by the device, and electrically testing the internal lead to determine if it has been adversely affected by the magnetic field. The apparatus comprises adjustable means for establishing a magnetic field of predetermined intensity, movable support means for positioning a bonded member within the magnetic field and electrical means for indicating if the magnetic field has adversely affected the bonded member.

Although the movable support means is illustrated herein as a rotatable table, it may be any type of movable support structure, such as a longitudinally movable conveyor belt which is made of nonmagnetic material and has apertures therein for holding a plurality of semiconductor devices, for example. Furthermore, although only a single magnetic device is shown herein, this invention may be practiced simultaneously with a plurality of such magnetic devices. Moreover, although this invention has been described herein in conjunction with a semiconductor device having internal leads made of fine wire, it also may be used for testing other types of internal or external bonded leads, such as plated beam-leads, for example.

From the foregoing, it will be apparent that all of the objectives of this invention have been achieved by the structures shown and described. It will be also apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. Apparatus for controllably stressing internal conductors of a closed device, the apparatus comprising:
   support means for positioning an internal conductor of the device in a preferred location;
   magnetic means supported adjacent an exterior surface of the device for establishing adjacent the conductor an arcuate magnetic field having a localized region of maximum intensity adjacent the exterior surface and for pulling the conductor toward the region of maximum intensity; and
   electrical means operatively connected to the internal conductor for passing an electrical current through the conductor in cooperation with the action of the magnetic field, the electrical means including monitoring means for determining if the conductor is at least partially separated from a connecting portion of the device by the action of the magnetic field.

2. Apparatus as set forth in claim 1 wherein the magnetic means includes a magnet having a generally U-shaped closed end and convergent pole pieces which terminate in close spaced relationship with one another to form a gap therebetween and adjacent the exterior surface of the device.

3. Apparatus as set forth in claim 2 wherein the convergent pole pieces have adjacent side surfaces which merge with respective terminal end surfaces thereof to provide sharply contoured ridges on opposing sides of the gap.

4. Apparatus as set forth in claim 3 wherein the magnet is an electromagnet having a coil connected to a source of pulsating current.

5. Apparatus as set forth in claim 1 wherein the support means and the magnetic means are supported for relative movement with respect to one another.

* * * * *